(12) United States Patent
Chen et al.

(10) Patent No.: US 10,513,601 B2
(45) Date of Patent: *Dec. 24, 2019

(54) ETHYLENE-PROPYLENE COPOLYMERS WITH AMORPHOUS AND SEMI-CRYSTALLINE COMPONENTS

(71) Applicant: ExxonMobil Chemical Patents Inc., Baytown, TX (US)

(72) Inventors: Xin Chen, Humble, TX (US); Sudhin Datta, Houston, TX (US); Rohan A. Hule, Houston, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 33 days.

This patent is subject to a terminal disclaimer.

(21) Appl. No.: 15/815,815

(22) Filed: Nov. 17, 2017

(65) Prior Publication Data

US 2018/0186986 A1    Jul. 5, 2018

Related U.S. Application Data

(60) Provisional application No. 62/442,659, filed on Jan. 5, 2017.

(51) Int. Cl.
*C08L 23/16* (2006.01)
*C08L 23/14* (2006.01)
*C08L 23/08* (2006.01)

(52) U.S. Cl.
CPC ........... *C08L 23/16* (2013.01); *C08L 23/0815* (2013.01); *C08L 23/142* (2013.01); *C08L 2205/06* (2013.01); *C08L 2207/04* (2013.01); *C08L 2207/14* (2013.01)

(58) Field of Classification Search
CPC ...... C08L 23/14; C08L 23/16; C08L 23/0815; C08L 23/142; C08L 2207/04; C08L 2207/14; C08L 2205/025; C08L 2205/03; B01J 2219/00274; B01J 8/04; B01F 2003/0042

See application file for complete search history.

(56) References Cited

U.S. PATENT DOCUMENTS

| | | | |
|---|---|---|---|
| 4,833,194 A | 5/1989 | Kuan et al. | |
| 5,360,868 A * | 11/1994 | Mosier et al. | C08L 23/10 524/505 |
| 5,763,534 A | 6/1998 | Srinivasan et al. | |
| 5,959,030 A | 9/1999 | Berta | |
| 6,232,402 B1 | 5/2001 | Demeuse | |
| 6,245,856 B1 | 6/2001 | Kaufman et al. | |
| 6,288,171 B2 | 9/2001 | Finerman et al. | |
| 2009/0053959 A1 | 2/2009 | Datta et al. | |
| 2012/0028865 A1 | 2/2012 | Datta et al. | |
| 2015/0025209 A1 | 1/2015 | Canich et al. | |
| 2018/0186982 A1 * | 7/2018 | Chen et al. | C08L 23/12 |

FOREIGN PATENT DOCUMENTS

| | | |
|---|---|---|
| EP | 0 638 611 A | 2/1995 |
| EP | 0 792 914 A | 9/1997 |
| EP | 0 875 535 A | 11/1998 |
| EP | 1 344 797 A | 9/2003 |
| WO | 97/20888 A | 6/1997 |
| WO | 2016/057124 A | 4/2016 |

OTHER PUBLICATIONS

U.S. Appl. No. 15/724,401, Chen et al., filed Oct. 4, 2017.
U.S. Appl. No. 15/786,051, Chen et al., filed Oct. 17, 2017.

* cited by examiner

*Primary Examiner* — Nathan M Nutter
(74) *Attorney, Agent, or Firm* — Chad A. Guice

(57) ABSTRACT

This invention relates to a polyolefin composition with (a) 80 to 90 wt % of an amorphous ethylene-propylene copolymer having either no crystallinity or crystallinity derived from ethylene, having about 30 wt % or more units derived from ethylene; (b) 5 to 15 wt % of a semi-crystalline ethylene-propylene copolymer having substantial crystallinity derived from ethylene and having 70 wt % or more units derived from ethylene; and (c) 1 to 5 wt % of a propylene-based elastomer having within the range from 5 to 25 wt % ethylene derived units and having a melting point temperature of less than 110° C. and a Mw/Mn within the range from 2.0 to 4.0.

16 Claims, No Drawings

ETHYLENE-PROPYLENE COPOLYMERS WITH AMORPHOUS AND SEMI-CRYSTALLINE COMPONENTS

PRIORITY CLAIM

This application claims the benefit of Provisional Application No. 62/442,659, filed Jan. 5, 2017, the disclosure of which is incorporated herein by reference.

FIELD OF THE INVENTION

The present invention relates to an ethylene-propylene copolymer, where the composition of the ethylene-propylene copolymer has improved pellet stability.

BACKGROUND OF THE INVENTION

Polypropylene-based Thermoplastic Olefin Compositions (TPO) are blends of polypropylene, an elastomer, optional propylene-based elastomers, and optional non-polymeric components such as fillers and other compounding ingredients. Included in the category of TPO compositions are so called impact copolymers ("ICP") compositions, typically non-cured. Typically, TPOs are multiphase polymer blends where a polypropylene forms a continuous matrix phase and the elastomer component, generally derived from an ethylene containing interpolymer, is the dispersed component. The polypropylene matrix imparts tensile strength and chemical resistance to the TPO, while the ethylene polymer imparts stiffness and impact resistance. Typically, ICPs and TPOs have a dispersed phase which is not, or only modestly, cross-linked.

Traditionally, very low density ethylene-propylene copolymers and ethylene-propylene-diene terpolymers have been used as the modifier component in TPO compositions. The major market for TPOs is in the manufacture of automotive parts, especially bumper fascia. Other applications include automotive interior components, such as door skin, air bag cover, side pillars and the like. These parts are generally made using an injection molding process. Recently, other ethylene-alpha olefin copolymers have been used, especially very low density ethylene-butene, ethylene-hexene and ethylene-octene copolymers which generally have a lower molecular weight expressed in Melt Index units. The density of these latter polymers is generally less than 0.900 g/cm$^3$, indicative of little, if any residual crystallinity in the polymer. Such low crystallinity polymers tend to agglomerate into large, intractable pieces on storage. To increase efficiency and reduce costs, it is necessary to decrease molding times and reduce wall thickness in the molds. To accomplish these goals, manufacturers have turned to high melt flow polypropylenes (Melt Flow Rate greater than 35 g/10 min). These high melt flow rate (MFR) resins are low in molecular weight and consequently difficult to toughen, resulting in products that have low impact strength. Additionally, conventional traditional modifier components do not have a balance of good low temperature toughness in blend with polypropylene while maintaining pellet stability.

There is a need, therefore, for TPO manufacturers to be able to broaden the scope of polymers available to manufacture end use items with a better balance between the performance of the hetero phase composition in its end use, the processability during conversion of the molten compositions into the end use article, a toughness at low temperature while maintaining pellet stability, and the cost of providing those properties.

References of interest include U.S. Pat. Nos. 6,245,856; 6,288,171; 6,232,402; 5,959,030; US 2009/053959; WO 97/20888; US 2015/0025209, EP 0 792 914, and WO 16/057124.

SUMMARY OF THE INVENTION

This invention is directed to a room temperature shape retentive polyolefin blend composition comprising: (a) about 80 wt % to about 90 wt % of an amorphous ethylene-propylene copolymer having either no crystallinity or crystallinity derived from ethylene, having about 30 wt % or more units derived from ethylene; (b) about 5 wt % to about 15 wt % of a semi-crystalline ethylene-propylene copolymer having substantial crystallinity derived from ethylene and having about 70 wt % or more units derived from ethylene; and (c) about 1 wt % to about 5 wt % of a propylene-based elastomer having within the range from 5 to 25 wt % ethylene derived units and having a melting point temperature of less than 110° C. and a Mw/Mn within the range from 2.0 to 4.0.

DETAILED DESCRIPTION

Disclosed is a blend composition containing an amorphous ethylene-propylene copolymer (EP), semi-crystalline EP, and a propylene-based elastomer.

Various specific embodiments and versions of the present invention will now be described, including preferred embodiments and definitions that are adopted herein. While the following detailed description gives specific preferred embodiments, those skilled in the art will appreciate that these embodiments are exemplary only, and that the present invention can be practiced in other ways. Any reference to the "invention" may refer to one or more, but not necessarily all, of the embodiments defined by the claims. The use of headings is for purposes of convenience only and does not limit the scope of the present invention.

All numerical values within the detailed description and the claims herein are modified by "about" or "approximately" the indicated value, and take into account experimental error and variations that would be expected by a person having ordinary skill in the art.

Various terms as used herein are defined below. To the extent a term used in a claim is not defined below, it should be given the broadest definition persons in the pertinent art have given that term as reflected in at least one printed publication (e.g., a dictionary or article), issued patent or published application.

Polymer. Except as required by the particular context, the term "polymer" used herein is the product produced by particular continuous polymerization in a particular polymerization zone or reactor.

Polymerization. As used herein, the term "polymerization" to be given the broadest meaning used by persons skilled in the art refers to the conversion of monomer into polymer. Polymerization zone refers to the zone in which polymerization takes place and is generally formed by a back mixed reactor for forming a substantially random polymer.

Polysplit. As used herein, the term "polysplit" shall mean the calculated result of the weight of the first polymer (ethylene polymer) that is produced from the first polymerization zone divided by the combined weight of the first polymer and the second polymer (propylene polymer). The same definition applies equally to series and parallel reactor configurations. That is, the ethylene polymer is always regarded as the numerator.

Ethylene-Propylene Copolymer Containing Amorphous EP, Semi Crystalline EP

The combined ethylene-propylene copolymer is a blend of an amorphous EP and semi-crystalline EP. The blends described herein are formed in either batch or continuous "multistage polymerization," meaning that two (or more) different polymerizations (or polymerization stages) are conducted. More specifically, a multistage polymerization may involve either two or more sequential polymerizations (also referred to herein as a "series process") two or more parallel polymerizations (also referred to herein as a "parallel process"). Preferably, the polymerization is conducted in a parallel process.

The polymers made in the respective reactors of the continuous, multiple reactor solution plant are blended when in solution without prior isolation from the solvent. The blends may be the result of series reactor operation, where the effluent of a first reactor enters a second reactor and where the effluent of the second reactor can be submitted to finishing steps involving devolatilization. The blend may also be the result of parallel reactor operation where the effluents of both reactors are combined and submitted to finishing steps. Either option provides an intimate admixture of the polymers in the devolatilized blend. Either case permits a wide variety of polysplits to be prepared whereby the proportion of the amounts of polymers produced in the respective reactors can be varied widely. The first polymer and second polymer making up the blend composition are discussed below. The process to make the first and second polymer is disclosed in U.S. Patent Application Ser. No. 62/315,929, filed on Mar. 31, 2016, incorporated herein by reference.

Combined Ethylene-Propylene Copolymer

The weight percent of ethylene-derived units of the amorphous EP is preferably in the range of 35 wt % to 55 wt %; in some embodiments, in the range of 40 wt % to 53 wt %; in other embodiments, in the range of 45 wt % to 53 wt %; and in still yet other embodiments in the range of about 47 wt % to 52 wt %. The amorphous EP can have a weight percent of ethylene-derived units based on the weight of the combined ethylene-propylene copolymer (the amorphous EP and the semi-crystalline EP) ranging from a low of about 30 wt %, about 33 wt %, about 35 wt %, about 37 wt %, or about 40 wt % to a high of about 45 wt %, about 47 wt %, about 50 wt %, about 52 wt %, or about 54 wt %.

The weight percent of ethylene-derived units of the semi-crystalline EP is preferably in the range of 35 wt % to 85 wt %; in some embodiments, in the range of 55 wt % to 80 wt %; in other embodiments, in the range of 65 wt % to 80 wt %; in still other embodiments, in the range of 67 wt % to 80 wt %; and still yet other embodiments 67 wt % to 77 wt %; and still yet other embodiments about 73 wt %. The semi-crystalline EP can have a weight percent of ethylene-derived units based on the weight of the combined ethylene-propylene copolymer (the amorphous EP and the semi-crystalline EP) ranging from low of about 60 wt %, about 63 wt %, about 65 wt %, about 67 wt %, or about 70 wt % to a high of about 80 wt %, about 83 wt %, about 85 wt %, or about 87 wt %.

In some embodiments, the ethylene weight percent of the amorphous EP may be less than the ethylene weight percent of the semi-crystalline EP. In some embodiments, the combined ethylene-propylene copolymer may be characterized by the difference in the ethylene weight percent of the amorphous and the semi-crystalline EPs. In some embodiments, the difference in the ethylene weight percent of the semi-crystalline EP and the amorphous EP is greater than about 12; in other embodiments, greater than about 17; in still other embodiments, greater than about 21; in still yet other embodiments, greater than about 23. In some embodiments, the difference in ethylene weight percent is in the range of greater than about 17 and less than about 23; in other embodiments, the difference is about 21. The difference between the weight percent of ethylene-derived units of the semi-crystalline EP and the amorphous EP can range from a low of about 12, about 14, about 16, or about 18 to a high of about 20, about 22, about 23, or about 24.

The heat of fusion of the amorphous EP is in the range of 0 to less than about 30 J/g; in some embodiments, in the range of 0 to less than about 15 J/g; in other embodiments, in the range of 0 to less than about 10 J/g; in still other embodiments, in the range of 0 to less than about 5 J/g; and in still yet other embodiments, the heat of fusion is about 2 J/g. In one or more embodiments, the amorphous EP can have a heat of fusion on ranging from a low of about 0 J/g, about 1 J/g, or about 2 J/g to a high of about 8 J/g, about 9 J/g, or about 10 J/g.

The heat of fusion of the semi-crystalline EP is in the range of 30 to less than about 60 J/g; in some embodiments, in the range of 35 to less than about 55 J/g; in other embodiments, in the range of 40 to less than about 50 J/g; and still yet other embodiments the heat of fusion is about 45. In one or more embodiments, the semi-crystalline EP can have a heat of fusion ranging from a low of about 30 J/g, about 33 J/g, about 35 J/g, or about 37 J/g to a high of about 47 J/g, about 50 J/g, about 53 J/g, about 57 J/g, or about 60 J/g.

In some embodiments, the heat of fusion of the amorphous EP may be less than the heat of fusion of the semi-crystalline EP. In some embodiments, the difference in the heat of fusion of the semi-crystalline EP and the amorphous EP in J/g is greater than about 4; in other embodiments, greater than about 8; in still other embodiments, greater than about 12; in still yet other embodiments, greater than about 16.

The amorphous EP may be characterized by a weight-average molecular weight of less than or equal to 130,000, or less than 120,000, or less than 110,000, or less than 100,000, or less than 90,000, or less than 80,000, or less than 70,000. Preferably, the weight average molecular weight is from 70,000 to 95,000. In one or more embodiments, the amorphous EP can have a weight-average molecular weight ranging from a low of about 60,000, about 65,000, about 70,000, or about 75,000 to a high of about 90,000, about 95,000, about 100,000, about 105,000, or about 115,000.

The amorphous EP can have a concentration or content of ethylene-derived units ranging from about 50 mol % to about 70 mol % and a content of comonomer-derived units ranging from about 50 mol % to about 30 mol %. The amorphous EP can also have an MFR ranging from about 0.2 to about 25. The amorphous EP can also have a molecular weight distribution (Mw/Mn) of from about 1.5 to about 3.

The amount of ethylene-derived units in the semi-crystalline EP, can be greater than about 70 mol %, greater than about 74 mol %, or greater than about 78 mol %. The semi-crystalline EP can also have an MFR ranging from about 0.2 to about 25. The semi-crystalline EP can also have a molecular weight distribution (Mw/Mn) ranging from about 1.5 to about 3.

Each discrete ethylene-propylene based copolymer can be polymerized in a single, well stirred tank reactor in solution by a metallocene catalyst. The process to polymerize the amorphous EP and the semi-crystalline EP is described in U.S. Pat. No. 8,999,907, incorporated herein by reference.

The semi-crystalline EP may be characterized by a weight-average molecular weight of less than or equal to 130,000, or less than 120,000, or less than 110,000, or less than 100,000, or less than 90,000, or less than 80,000, or less than 70,000. Preferably, the weight average molecular weight is from 70,000 to 95,000. In one or more embodiments, the semi-crystalline EP can have a weight-average molecular weight ranging from a low of about 60,000, about 65,000, about 70,000, or about 75,000 to a high of about 90,000, about 95,000, about 100,000, about 105,000, or about 115,000.

In some embodiments, ratio of the melt index of the amorphous EP to that of the semi-crystalline EP is less than or equal to 3, less than or equal to 2, less than or equal to 1. The ratio of the melt index of the amorphous EP to the melt index of the semi-crystalline EP can be less than about 3.0, less than about 2.8, less than about 2.6, less than about 2.4, less than about 2.2, less than about 1.8, or less than about 1.6.

In some embodiments, the absolute value of the difference in the melt index of the amorphous EP and the melt index of the semi-crystalline EP is less than about 3.0; in other embodiments it is less than about 2.5; in still yet other embodiments, less than about 2.0; in still yet other embodiments, less than about 1.5; in still yet other embodiments, less than about 1.1; and still yet other embodiments, less than about 1.0.

The amorphous or semi-crystalline EP can have a MWD of less than 3.0, or less than 2.4, or less than 2.2, or less than 2.0. Preferably, the MWD for the amorphous and/or semi-crystalline EP is in the range of greater than or equal to 1.80 to less than or equal to 1.95.

In some embodiments, the comonomer insertion sequences of the amorphous and semi-crystalline EPs can be the same or different. The insertion sequences can provide linear polymer structure or substantially linear polymer structure. The substantially linear structure of either the amorphous or semi-crystalline EP has less than 1 branch point pendant with a carbon chain larger than 19 carbon atoms per 200 carbon atoms along a backbone, less than 1 branch point pendant with a carbon chain larger than 19 carbon atoms per 300 branch points, less than 1 branch point pendant with a carbon chain larger than 19 carbon atoms per 500 carbon atoms, and preferably less than 1 branch point pendant with a carbon chain larger than 19 carbon atoms per 1000 carbon atoms notwithstanding the presence of branch points due to incorporation of the comonomer.

Suitable comonomers include, but are not limited to, propylene ($C_3$) and other alpha-olefins, such as $C_4$ to $C_{20}$ alpha-olefins (also referred to herein as "α-olefins"), and preferably propylene and $C_4$ to $C_{12}$ α-olefins. The α-olefin comonomer can be linear or branched, and two or more comonomers can be used, if desired. Thus, reference herein to "an alpha-olefin comonomer" includes one, two, or more alpha-olefin comonomers.

Examples of suitable comonomers include propylene, linear $C_4$ to $C_{12}$ α-olefins, and α-olefins having one or more $C_1$ to $C_3$ alkyl branches. Specific examples include: propylene; 1-butene; 3-methyl-1-butene; 3,3-dimethyl-1-butene; 1-pentene; 1-pentene with one or more methyl, ethyl or propyl substituents; 1-hexene with one or more methyl, ethyl or propyl substituents; 1-heptene with one or more methyl, ethyl or propyl substituents; 1-octene with one or more methyl, ethyl or propyl substituents; 1-nonene with one or more methyl, ethyl or propyl substituents; ethyl, methyl or dimethyl-substituted 1-decene, or 1-dodecene. Preferred comonomers include: propylene, 1-butene, 1-pentene, 3-methyl-1-butene, 1-hexene, 3-methyl-1-pentene, 4-methyl-1-pentene, 3,3-dimethyl-1-butene, 1-heptene, 1-hexene with a methyl substituents on any of $C_3$ to $C_5$, 1-pentene with two methyl substituents in any stoichiometrically acceptable combination on $C_3$ or $C_4$, 3-ethyl-1-pentene, 1-octene, 1-pentene with a methyl substituents on any of $C_3$ or $C_4$, 1-hexene with two methyl substituents in any stoichiometrically acceptable combination on $C_3$ to $C_5$, 1-pentene with three methyl substituents in any stoichiometrically acceptable combination on $C_3$ or $C_4$, 1-hexene with an ethyl substituents on $C_3$ or $C_4$, 1-pentene with an ethyl substituents on $C_3$ and a methyl substituents in a stoichiometrically acceptable position on $C_3$ or $C_4$, 1-decene, 1-nonene, 1-nonene with a methyl substituents on any of $C_3$ to $C_9$, 1-octene with two methyl substituents in any stoichiometrically acceptable combination on $C_3$ to $C_7$, 1-heptene with three methyl substituents in any stoichiometrically acceptable combination on $C_3$ to $C_6$, 1-octene with an ethyl substituents on any of $C_3$ to $C_7$, 1-hexene with two ethyl substituents in any stoichiometrically acceptable combination on $C_3$ or $C_4$, and 1-dodecene.

Other suitable comonomers can include internal olefins. Preferred internal olefins are cis 2-butene and trans 2-butene. Other internal olefins are contemplated. When an internal olefin is present, negligible amounts, such as about 2 wt % or less of the total amount of the internal olefin, can be present in the low ethylene-content copolymer, and most of the internal olefin, such as about 90 wt % or more of the total amount of the internal olefin, can be present in the high ethylene-content copolymer.

Suitable comonomers can also include one or more polyenes. Suitable polyenes can include non-conjugated dienes, preferably those that are straight chain, hydrocarbon di-olefins or cycloalkenyl-substituted alkenes, having about 6 to about 15 carbon atoms, for example: (a) straight chain acyclic dienes, such as 1,4-hexadiene and 1,6-octadiene; (b) branched chain acyclic dienes, such as 5-methyl-1,4-hexadiene; 3,7-dimethyl-1,6; (c) single ring alicyclic dienes, such as 1,4-cyclohexadiene; 1,5-cyclo-octadiene and 1,7-cyclododecadiene; (d) multi-ring alicyclic fused and bridged ring dienes, such as tetrahydroindene, norbornadiene, methyl-tetrahydroindene, dicyclopentadiene (DCPD), bicyclo-(2.2.1)-hepta-2,5-diene, alkenyl, alkylidene, cycloalkenyl and cycloalkylidene norbornenes, such as 5-methylene-2-norbornene (MNB), 5-propenyl-2-norbornene, 5-isopropylidene-2-norbornene, 5-(4-cyclopentenyl)-2-norbornene, 5-cyclohexylidene-2-norbornene, and 5-vinyl-2-norbornene (VNB); and (e) cycloalkenyl-substituted alkenes, such as vinyl cyclohexene, allyl cyclohexene, vinyl cyclooctene, 4-vinyl cyclohexene, allyl cyclodecene; and vinyl cyclododecene. Of the non-conjugated dienes typically used, the preferred dienes are dicyclopentadiene (DCPD), 1,4-hexadiene, 1,6-octadiene; 5-methyl-1,4-hexadiene; 3,7-dimethyl-1,6-octadiene; 5-methylene-2-norbornene, 5-ethylidene-2-norbornene (ENB), and tetracyclo(Δ-11,12) 5,8 dodecene. It is preferred to use dienes which do not lead to the formation of long chain branches, and non- or lowly branched polymer chains are preferred. Other polyenes that can be used include cyclopentadiene and octatetraene; and the like. When a polyene is present, the EPs can include up to 5 mol %, up to 4 mol %, up to 3 mol %, up to 2 mol %, and up to 1 mol % polyene-derived units. In some embodiments, the amount of polyene, when present, can range from about 0.5 mol % to about 4 mol %; about 1.0 mol % to about 3.8 mol %; or about 1.5 mol % to about 2.5 mol %.

The amorphous and the semi-crystalline EPs can be combined such that the amorphous EP (typically the ethylene-based copolymer with a lower wt % ethylene) can be present in an amount of about 75 wt % to about 90 wt %, based on the combined ethylene-propylene copolymers. The amorphous and semi-crystalline copolymers can also be combined in a predetermined weight ratio such that the ethylene-based copolymer with greater crystallinity (the semi-crystalline EP) can be present in an amount of about 10 wt % to about 25 wt %, based on the combined weight of the EPs. In one or more embodiments, the amorphous EP can be present in an amount less than about 65 wt %, less than about 60 wt %, less than about 55 wt %, less than about 50 wt %, or less than about 45 wt %, based on the combined weight of the EPs.

Propylene Based Elastomer

As noted above, the blends herein preferably include at least one propylene based elastomer, referred to herein as PBE.

The polymer blends used to form the TPOs described herein comprise one or more PBEs. The PBE comprises propylene and from 5 to 25 wt % of one or more comonomers selected from ethylene and/or $C_4$-$C_{12}$ α-olefins. The α-olefin comonomer units may be derived from ethylene, butene, pentene, hexene, 4-methyl-1-pentene, octene, or decene. In preferred embodiments the α-olefin is ethylene. In some embodiments, the propylene-based polymer composition consists essentially of propylene and ethylene, or consists only of propylene and ethylene. The embodiments described below are discussed with reference to ethylene as the α-olefin comonomer, but the embodiments are equally applicable to other copolymers with other α-olefin comonomers. In this regard, the copolymers may simply be referred to as propylene-based polymers with reference to ethylene as the α-olefin.

The PBE may include at least 5 wt %, at least 6 wt %, at least 7 wt %, or at least 8 wt %, or at least 9 wt %, or at least 10 wt %, or at least 12 wt % ethylene-derived units, where the percentage by weight is based upon the total weight of the propylene-derived and ethylene-derived units. The PBE may include up to 30 wt %, or up to 25 wt %, or up to 22 wt %, or up to 20 wt %, or up to 19 wt %, or up to 18 wt %, or up to 17 wt % ethylene-derived units, where the percentage by weight is based upon the total weight of the propylene-derived and ethylene-derived units. In some embodiments, the PBE may comprise from 5 to 25 wt % ethylene-derived units, or from 7 wt % to 20 wt % ethylene, or from 9 to 18 wt % ethylene-derived units, where the percentage by weight is based upon the total weight of the propylene-derived and ethylene-derived units.

The PBE may include at least 70 wt %, or at least 75 wt %, or at least 80 wt %, or at least 81 wt % propylene-derived units, or at least 82 wt %, or at least 83 wt % propylene-derived units, where the percentage by weight is based upon the total weight of the propylene-derived and α-olefin derived units. The PBE may include up to 95 wt %, or up to 94 wt %, or up to 93 wt %, or up to 92 wt %, or up to 90 wt %, or up to 88 wt % propylene-derived units, where the percentage by weight is based upon the total weight of the propylene-derived and α-olefin derived units.

The $T_m$ of the PBE (as determined by DSC) may be less than 115° C., or less than 110° C., or less than 100° C., or less than 95° C., or less than 90° C. In some embodiments, the PBE may have two melting peaks as determined by DSC. In other embodiments, the PBE may have a single melting peak as determined by DSC.

The PBE may be characterized by its heat of fusion (Hf), as determined by DSC. The PBE may have an Hf that is at least 0.5 J/g, or at least 1.0 J/g, or at least 1.5 J/g, or at least 3.0 J/g, or at least 4.0 J/g, or at least 5.0 J/g, or at least 6.0 J/g, or at least 7.0 J/g. The PBE may be characterized by an Hf of less than 75 J/g, or less than 70 J/g, or less than 60 J/g, or less than 50 J/g, or less than 45 J/g, or less than 40 J/g, or less than 35 J/g, or less than 30 J/g, or less than 25 J/g.

Preferably, the propylene-based elastomer has within the range from 12 to 20 wt % ethylene derived units and having a melting point temperature ($T_m$) of less than 110° C. Most preferably, the propylene-based elastomer has a melting point temperature ($T_m$) within the range of from 80, or 90° C. to 110° C. (first melt).

The PBE can have a triad tacticity of three propylene units (mmm tacticity), as measured by 13C NMR, of 75% or greater, 80% or greater, 85% or greater, 90% or greater, 92% or greater, 95% or greater, or 97% or greater. In one or more embodiments, the triad tacticity may range from 75 to 99%, or from 80 to 99%, or from 85 to 99%, or from 90 to 99%, or from 90 to 97%, or from 80 to 97%. The PBE may have a tacticity index m/r ranging from a lower limit of 4 or 6 to an upper limit of 8 or 10 or 12.

Certain propylene polymers have an isotacticity index greater than 0%, or within the range having an upper limit of 50%, or 25% and a lower limit of 3%, or 10%.

Certain propylene polymers can have a tacticity index (m/r) within the range having an upper limit of 800, or 1000, or 1200, and those polymers may have a lower limit of 40, or 60.

The PBE may have a % crystallinity of from 0.5% to 40%, or from 1% to 30%, or from 5% to 25%, determined according to DSC procedures.

The PBE may have a density of from 0.85 g/cm$^3$ to 0.92 g/cm$^3$, or from 0.86 g/cm$^3$ to 0.90 g/cm$^3$, or from 0.86 g/cm$^3$ to 0.89 g/cm$^3$ at 22° C.

The PBE can have a melt index (MI), of less than or equal to 100 g/10 min, or less than or equal to 50 g/10 min, or less than or equal to 25 g/10 min, or less than or equal to 10 g/10 min, or less than or equal to 9.0 g/10 min, or less than or equal to 8.0 g/10 min, or less than or equal to 7.0 g/10 min.

The PBE may have a melt flow rate (MFR), greater than 1 g/10 min, or greater than 2 g/10 min, or greater than 5 g/10 min, or greater than 8 g/10 min, or greater than 10 g/10 min. The PBE may have an MFR less than 1,000 g/10 min, or less than 750 g/10 min, or less than 500 g/10 min, or less than 400 g/10 min, or less than 300 g/10 min, or less than 200 g/10 min, or less than 100 g/10 min, or less than 75 g/10 min, or less than 50 g/10 min. In some embodiments, the PBE may have an MFR from 1 to 100 g/10 min, or from 2 to 75 g/10 min, or from 5 to 50 g/10 min.

In some embodiments, the PBE may be a reactor grade polymer, as defined above. In other embodiments, the PBE may be a polymer that has been visbroken after exiting the reactor to increase the MFR.

The PBE may have a g' index value of 0.95 or greater, or at least 0.97, or at least 0.99.

The PBE may have a weight average molecular weight (Mw) of from 50,000 to 5,000,000 g/mol, or from 75,000 to 1,000,000 g/mol, or from 100,000 to 500,000 g/mol, or from 125,000 to 300,000 g/mol. Most preferably, the weight average molecular weight (Mw) of the propylene-based elastomer is at least 150,000 g/mole; or within a range from 150,000, or 200,000 g/mole to 300,000, or 400,000, or 500,000 g/mole.

The PBE may have a number average molecular weight (Mn) of from 2,500 to 2,500,000 g/mol, or from 5,000 to 500,000 g/mol, or from 10,000 to 250,000 g/mol, or from 25,000 to 200,000 g/mol. The PBE may have a Z-average molecular weight (Mz) of from 10,000 to 7,000,000 g/mol, or from 50,000 to 1,000,000 g/mol, or from 80,000 to 700,000 g/mol, or from 100,000 to 500,000 g/mol. The molecular weight distribution (MWD, equal to Mw/Mn) of the PBE may be from 1 to 40, or from 1 to 15, or from 1.8 to 5, or from 1.8 to 3.

Optionally, the propylene-based polymer compositions may also include one or more dienes. In embodiments where the propylene-based polymer compositions comprises a diene, the diene may be present at from 0.05 wt % to 6 wt % diene-derived units, or from 0.1 wt % to 5.0 wt % diene-derived units, or from 0.25 wt % to 3.0 wt % diene-derived units, or from 0.5 wt % to 1.5 wt % diene-derived units, where the percentage by weight is based upon the total weight of the propylene-derived, alpha-olefin derived, and diene-derived units. Preferably, the propylene-based polymer composition is substantially free of diene. "Substantially free" means less than 0.05 wt %.

In one or more embodiments, the PBE can optionally be grafted (i.e., "functionalized") using one or more grafting monomers. As used herein, the term "grafting" denotes covalent bonding of the grafting monomer to a polymer chain of the PBE. The grafting monomer can be or include at least one ethylenically unsaturated carboxylic acid or acid derivative, such as an acid anhydride, ester, salt, amide, imide, acrylates or the like. Illustrative monomers include but are not limited to acrylic acid, methacrylic acid, maleic acid, fumaric acid, itaconic acid, citraconic acid, mesaconic acid, maleic anhydride, 4-methyl cyclohexene-1,2-dicarboxylic acid anhydride, bicyclo(2.2.2)octene-2,3-dicarboxylic acid anhydride, 1,2,3,4,5,8,9,10-octahydronaphthalene-2,3-dicarboxylic acid anhydride, 2-oxa-1,3-diketospiro(4.4)nonene, bicyclo(2.2.1)heptene-2,3-dicarboxylic acid anhydride, maleopimaric acid, tetrahydrophthalic anhydride, norbornene-2,3-dicarboxylic acid anhydride, nadic anhydride, methyl nadic anhydride, himic anhydride, methyl himic anhydride, and 5-methylbicyclo(2.2.1)heptene-2,3-dicarboxylic acid anhydride. Other suitable grafting monomers include methyl acrylate and higher alkyl acrylates, methyl methacrylate and higher alkyl methacrylates, acrylic acid, methacrylic acid, hydroxy-methyl methacrylate, hydroxyl-ethyl methacrylate and higher hydroxy-alkyl methacrylates and glycidyl methacrylate. Maleic anhydride is a preferred grafting monomer. In one or more embodiments, the grafted PBE comprises from 0.5 to 10 wt % ethylenically unsaturated carboxylic acid or acid derivative, more preferably from 0.5 to 6 wt %, more preferably from 0.5 to 3 wt %; in other embodiments from 1 to 6 wt %, more preferably from 1 to 3 wt %. In a preferred embodiment, wherein the graft monomer is maleic anhydride, the maleic anhydride concentration in the grafted polymer is preferably in the range of 1 to 6 wt %, preferably at least 0.5 wt %, and highly preferably 1.5 wt %.

In some embodiments, the PBE is a reactor blend of a first polymer component and a second polymer component. Thus, the comonomer content of the PBE can be adjusted by adjusting the comonomer content of the first polymer component, adjusting the comonomer content of second polymer component, and/or adjusting the ratio of the first polymer component to the second polymer component present in the propylene-based polymer composition. In such embodiments, the first polymer component may comprise propylene and ethylene and have an ethylene content of greater than 10 wt % ethylene, or greater than 12 wt % ethylene, or greater than 13 wt % ethylene, or greater than 14 wt % ethylene, or greater than 15 wt % ethylene, and an ethylene content that is less than 20 wt % ethylene, or less than 19 wt % ethylene, or less than 18 wt % ethylene, or less than 17 wt % ethylene, or less than 16 wt % ethylene, where the percentage by weight is based upon the total weight of the propylene-derived and ethylene derived units of the first polymer component. In such embodiments, the second polymer component may comprise propylene and ethylene and have an ethylene content of greater than 2 wt % ethylene, or greater than 3 wt % ethylene, or greater than 4 wt % ethylene, or greater than 5 wt % ethylene, or greater than 6 wt % ethylene, and an ethylene content that is less than 10 wt % ethylene, or less than 9.0 wt % ethylene, or less than 8 wt % ethylene, or less than 7 wt % ethylene, or less than 6 wt % ethylene, or less than 5 wt % ethylene, where the percentage by weight is based upon the total weight of the propylene-derived and ethylene derived units of the second polymer component. In such embodiments, the PBE may comprise from 3 to 25 wt % of the second polymer component, or from 5 to 20 wt % of the second polymer component, or from 7 to 18 wt % of the second polymer component, or from 10 to 15 wt % of the second polymer component, and from 75 to 97 wt % of the first polymer component, or from 80 to 95 wt % of the first polymer component, or from 82 to 93 wt % of the first polymer component, or from 85 to 90 wt % of the first polymer component, based on the weight of the PBE.

Polymerization of the PBE is conducted by reacting monomers in the presence of a catalyst system described herein at a temperature of from 0° C. to 200° C. for a time of from 1 second to 10 hours. Preferably, homogeneous conditions are used, such as a continuous solution process or a bulk polymerization process with excess monomer used as diluent. The continuous process may use some form of agitation to reduce concentration differences in the reactor and maintain steady state polymerization conditions. The heat of the polymerization reaction is preferably removed by cooling of the polymerization feed and allowing the polymerization to heat up to the polymerization, although internal cooling systems may be used.

Further description of exemplary methods suitable for preparation of the PBEs described herein may be found in U.S. Pat. Nos. 6,881,800; 7,803,876; 8,013,069; and 8,026,323.

The triad tacticity and tacticity index of the PBE may be controlled by the catalyst, which influences the stereoregularity of propylene placement, the polymerization temperature, according to which stereoregularity can be reduced by increasing the temperature, and by the type and amount of a comonomer, which tends to reduce the level of longer propylene derived sequences.

Too much comonomer may reduce the crystallinity provided by the crystallization of stereoregular propylene derived sequences to the point where the material lacks strength; too little and the material may be too crystalline.

The catalyst systems used for producing the PBE may comprise a metallocene compound. In any embodiment, the metallocene compound may be a bridged bisindenyl metallocene having the general formula $(In^1)Y(In^2)MX_2$, where $In^1$ and $In^2$ are identical substituted or unsubstituted indenyl groups bound to M and bridged by Y, Y is a bridging group in which the number of atoms in the direct chain connecting $In^1$ with $In^2$ is from 1 to 8 and the direct chain comprises C, Si, or Ge; M is a Group 3, 4, 5, or 6 transition metal; and $X_2$ are leaving groups. $In^1$ and $In^2$ may be substituted or unsubstituted. If In$^1$ and In$^2$ are substituted by one or more substituents, the substituents are selected from the group consisting of a halogen atom, $C_1$ to $C_{10}$ alkyl, $C_5$ to $C_{15}$ aryl, $C_6$ to $C_{25}$ alkylaryl, and Si—, N— or P— containing alkyl or aryl. Each leaving group X may be an alkyl, preferably methyl, or a halide ion, preferably chloride or fluoride. Exemplary metallocene compounds of this type include, but are not limited to, μ-dimethylsilylbis(indenyl) hafnium dimethyl and μ-dimethylsilylbis(indenyl) zirconium dimethyl.

Suitable PBEs for use in the present invention includes Vistamaxx™ grades available from ExxonMobil Chemical, such as Vistamaxx™ 6102.

The propylene polymer preferably comprises >60 wt %, more preferably >75 wt % propylene-derived units. In some embodiments, the propylene polymer comprises from 75-95 wt % of propylene-derived units, more preferably from 80-90 wt % of propylene-derived units, the balance comprising one or more .alpha.-olefins. Other suitable embodiments include propylene derived units in an amount (based on the weight of propylene and alpha-olefin) ranging from about 75-93 wt %, more preferably about 75-92.5 wt %, more preferably about 75-92 wt %, more preferably 75-92.5 wt %, more preferably 82.5-92.5 wt %, and more preferably about 82.5-92 wt %. Corresponding .alpha.-olefin ranges include 5-25 wt %, more preferably 7-25 wt %, more preferably 7.5-25 wt %, more preferably 7.5-17.5 wt % and more preferably 8-17.5 wt % (based on the weight of propylene and alpha-olefin). A preferred alpha-olefin is ethylene. The propylene polymer preferably has a MFR<about 800, more preferably <about 500, more preferably <about 200, more preferably <about 100, more preferably <about 50. Particularly preferred embodiments include a propylene polymer with an MFR of from about 1-25, more preferably about 1-20. The crystallinity of the propylene polymer should be derived from isotactic polypropylene sequences. The isotacticity of the propylene polymer can be illustrated by the presence of a preponderance of the propylene residues in the polymer in mm triads. As noted elsewhere herein, the tacticity of the propylene polymer is preferably greater than the tacticity of either the reactor blend or the ethylene polymer, e.g., where the propylene polymer is isotactic and the ethylene polymer is atactic.

For the propylene polymer, at least 75% by weight of the polymer, or at least 80% by weight, or at least 85% by weight, or at least 90% by weight, or at least 95% by weight, or at least 97% by weight, or at least 99% by weight of the polymer is soluble in a single temperature fraction, or in two adjacent temperature fractions, with the balance of the polymer in immediately preceding or succeeding temperature fractions. These percentages are fractions, for instance in hexane, beginning at 23° C. and the subsequent fractions are in approximately 8° C. increments above 23° C. Meeting such a fractionation requirement means that a polymer has statistically insignificant intermolecular differences of tacticity of the polymerized propylene.

Composition

Additives may by present in the compositions described herein and are preferably present, if at all, to an extent that does not negatively influence the impact or modulus of the composition or components made from the composition. The "additives" include fillers (especially silica, glass fibers, talc, etc.) colorants, whitening agents, cavitation agents, antioxidants, anti-slip agents, antifogging agents, nucleating agents, and other additives common in TPO compositions useful in automotive components. Other useful additives include stabilizers, mold release agents. Primary and secondary antioxidants include, for example, hindered phenols, hindered amines, and phosphates. Nucleating agents include, for example, sodium benzoate and talc. Dispersing agents such as AcroWax C can also be included. Slip agents include, for example, oleamide and erucamide. Catalyst deactivators are also commonly used, for example, calcium stearate, hydrotalcite, and calcium oxide. Preferably, the additive is talc in the amount of about 5 wt % to about 30 wt %, preferably about 10 wt % to about 25 wt %, most preferably about 20 wt % based on the weight of the composition.

The inventive compositions are most often described as a combination of its components and the properties of those components, but preferably the composition has a total ethylene content within the range of 6, or 10, or 12 to 16, or 18, or 20, or 24 wt %. The composition can be used to form any number of articles, which typically includes melt blending the components described herein and forming them into articles either before or after allowing the melt to cool. The "cooled melt blend" is thus the reaction product of melt blending the components, taking into account the possibility that there could be some transformation of one or more of the components facilitated by the heating and/or mixing process.

Useful Articles.

Preferred compositions herein are particularly useful for automotive applications, preferably for making molded high impact automotive parts such as car bumpers, e.g., bumper fascia. These compositions are blends, preferably physical blends, which have high impact and improved ductility.

Examples of automotive articles that can be made from one or more of the compositions described above or elsewhere herein include exterior or interior car components. More specific embodiments of such automotive articles include bumper fascia, fender liners, wheel well covers, body side moldings, pillar trim, door trim panels, consoles, instrument panel end-caps, instrument panel trims, airbag covers, glove box bins, rear quarter panels, lift gate panels, seat back covers, airbag components, airbags, instrument panel covers, dash board skins, air dams and headliner cartridges.

The various descriptive elements and numerical ranges disclosed herein for the inventive compositions can be combined with other descriptive elements and numerical ranges to describe the invention(s); further, for a given element, any upper numerical limit can be combined with any lower numerical limit described herein, including the examples. The features of the invention are demonstrated in the following non-limiting examples.

Polymer Analysis

The DSC procedures for determining $T_m$ and Hf include the following. The polymer is pressed at a temperature of from 200° C. to 230° C. in a heated press, and the resulting polymer sheet is hung, under ambient conditions (20-23.5° C.), in the air to cool. 6 to 10 mg of the polymer sheet is removed with a punch die. This 6 to 10 mg sample is annealed at room temperature (22° C.) for 80 to 100 hours. At the end of this period, the sample is placed in a DSC (Perkin Elmer Pyris One Thermal Analysis System) and cooled at a rate of about 10° C./min to −30° C. to −50° C. and held for 10 minutes at −50° C. The sample is heated at 10° C./min to attain a final temperature of 200° C. The sample is kept at 200° C. for 5 minutes. Then a second cool-heat cycle is performed, using the same conditions described above. Events from both cycles, "first melt" and "second melt", respectively, are recorded. The thermal output is recorded as the area under the melting peak of the sample, which typically occurs between 0° C. and 200° C.

It is measured in Joules and is a measure of the Hf of the polymer. Reference to melting point temperature herein refers to that recorded during the first melt.

Crystallinity is expressed as a percentage and for the propylene-based elastomers is determined by dividing the Hf in J/g by 88 J/g and multiplying by 100%.

Triad tacticity is determined by the methods described in U.S. Pat. No. 7,232,871.

Density is determined by ASTM D-792 test method.

Melt Index (MI) is measured per ASTM D-1238, 2.16 kg at 190° C.

Melt Flow Rate (MFR) is measured per ASTM D-1238 (2.16 kg weight at 230° C.).

Molecular weight (weight-average molecular weight, $M_w$, number-average molecular weight, $M_n$, and molecular weight distribution, $M_w/M_n$ or MWD) were determined using a High Temperature Size Exclusion Chromatograph (either from Waters Corporation or Polymer Laboratories), equipped with a differential refractive index detector (DRI), an online light scattering (LS) detector, and a viscometer. Three Polymer Laboratories PLgel 10 mm Mixed-B columns were used. The nominal flow rate was 0.5 cm$^3$/min, and the nominal injection volume was 300 μL. The various transfer lines, columns and differential refractometer (the DRI detector) were contained in an oven maintained at 145° C. Polysytrene was used to calibrate the instrument.

Solvent for the SEC experiment is prepared by dissolving 6 g of butylated hydroxy toluene as an antioxidant in 4 L of Aldrich reagent grade 1,2,4 trichlorobenzene (TCB). The TCB mixture is then filtered through a 0.7 μm glass pre-filter and subsequently through a 0.1 μm Teflon filter. The TCB is then degassed with an online degasser before entering the SEC. Polymer solutions are prepared by placing the dry polymer in a glass container, adding the desired amount of TCB, then heating the mixture at 160° C. with continuous agitation for about 2 hr. All quantities are measured gravimetrically. The TCB densities used to express the polymer concentration in mass/volume units are 1.463 g/mL at room temperature and 1.324 g/mL at 135° C. The injection concentration ranges from 1.0 to 2.0 mg/mL, with lower concentrations being used for higher molecular weight samples. Prior to running each sample, the DRI detector and the injector are purged. Flow rate in the apparatus is then increased to 0.5 mL/min, and the DRI was allowed to stabilize for 8-9 hr before injecting the first sample. The LS laser is turned on 1 to 1.5 hr before running samples.

The concentration, c, at each point in the chromatogram is calculated from the baseline-subtracted DRI signal, $I_{DRI}$, using the following equation:

$$c = K_{DRI} I_{DRI}/(dn/dc)$$

where $K_{DRI}$ is a constant determined by calibrating the DRI, and dn/dc is the same as described below for the LS analysis. Units on parameters throughout this description of the SEC method are such that concentration is expressed in g/cm$^3$, molecular weight is expressed in kg/mol, and intrinsic viscosity is expressed in dL/g.

The light scattering detector used is a Wyatt Technology High Temperature mini-DAWN. The polymer molecular weight, M, at each point in the chromatogram is determined by analyzing the LS output using the Zimm model for static light scattering (M. B. Huglin, Light Scattering from Polymer Solutions, Academic Press, 1971):

$$[K_o c/\Delta R(\theta,c)] = [1/MP(\theta)] + 2A_2 c$$

where $\Delta R(\theta)$ is the measured excess Rayleigh scattering intensity at scattering angle θ, c is the polymer concentration determined from the DRI analysis, $A_2$ is the second virial coefficient, $P(\theta)$ is the form factor for a monodisperse random coil (described in the above reference), and $K_o$ is the optical constant for the system:

$$K_o = \frac{4\pi^2 n^2 (dn/dc)^2}{\lambda^4 N_A}$$

in which $N_A$ is the Avogadro's number, and dn/dc is the refractive index increment for the system. The refractive index, n=1.500 for TCB at 135° C. and λ=690 nm. In addition, $A_2$=0.0015 and dn/dc=0.104 for ethylene polymers, whereas $A_2$=0.0006 and dn/dc=0.104 for propylene polymers.

The molecular weight averages are usually defined by considering the discontinuous nature of the distribution in which the macromolecules exist in discrete fractions i containing $N_i$ molecules of molecular weight $M_i$. The weight-average molecular weight, $M_w$, is defined as the sum of the products of the molecular weight $M_i$ of each fraction multiplied by its weight fraction $w_i$:

$$M_w \equiv \Sigma w_i M_i = (\Sigma N_i M_i^2 / \Sigma N_i M_i)$$

since the weight fraction $w_i$ is defined as the weight of molecules of molecular weight $M_i$ divided by the total weight of all the molecules present:

$$w_i = N_i M_i / \Sigma N_i M_i$$

The number-average molecular weight, $M_n$, is defined as the sum of the products of the molecular weight $M_i$ of each fraction multiplied by its mole fraction $x_i$:

$$M_n \equiv \Sigma x_i M_i = \Sigma N_i M_i / \Sigma N_i$$

since the mole fraction $x_i$ is defined as $N_i$ divided by the total number of molecules:

$$x_i = N_i / \Sigma N_i$$

In the SEC, a high temperature Viscotek Corporation viscometer is used, which has four capillaries arranged in a Wheatstone Bridge configuration with two pressure transducers. One transducer measures the total pressure drop across the detector, and the other, positioned between the two sides of the bridge, measures a differential pressure. The specific viscosity, $\eta_s$, for the solution flowing through the viscometer is calculated from their outputs. The intrinsic viscosity, [η], at each point in the chromatogram is calculated from the following equation:

$$\eta_s = c[\eta] + 0.3(c[\eta])^2$$

where c was determined from the DRI output.

The branching index (g', also referred to as g'(vis)) is calculated using the output of the SEC-DRI-LS-VIS method as follows. The average intrinsic viscosity, $[\eta]_{avg}$, of the sample is calculated by:

$$[\eta]_{avg} = \frac{\sum c_i [\eta]_i}{\sum c_i}$$

where the summations are over the chromatographic slices, i, between the integration limits.

The branching index g' is defined as:

$$g' = \frac{[\eta]_{avg}}{kM_v^\alpha}$$

where k=0.000579 and α=0.695 for ethylene polymers; k=0.0002288 and α=0.705 for propylene polymers; and k=0.00018 and α=0.7 for butene polymers.

G' is measured at the Mw of the polymer using the intrinsic viscosity of isotactic polypropylene as the baseline. For use herein, the g' index is defined as:

$$g' = \frac{\eta_b}{\eta_l}$$

where ηb is the intrinsic viscosity of the polymer and ηl is the intrinsic viscosity of a linear polymer of the same viscosity-averaged molecular weight (Mv) as the polymer. ηl=KMvα, K and α are measured values for linear polymers and should be obtained on the same instrument as the one used for the g' index measurement.

The comonomer content and sequence distribution of the polymers can be measured using $^{13}C$ nuclear magnetic resonance (NMR) by methods well known to those skilled in the art. Comonomer content of discrete molecular weight ranges can be measured using methods well known to those skilled in the art, including Fourier Transform Infrared Spectroscopy (FTIR) in conjunction with samples by GPC, as described in Wheeler and Willis, 47 APPLIED SPECTROSCOPY 1128-1130 (1993). For a propylene ethylene copolymer containing greater than 75 wt % propylene, the comonomer content (ethylene content) of such a polymer can be measured as follows: A thin homogeneous film is pressed at a temperature of 150° C. or greater, and mounted on a Perkin Elmer PE 1760 infrared spectrophotometer. A full spectrum of the sample from 600 $cm^{-1}$ to 4000 $cm^{-1}$ is recorded and the monomer wt % of ethylene can be calculated according to the following equation: Ethylene wt %=82.585−111.987X+30.045$X^2$, where X is the ratio of the peak height at 1155 $cm^{-1}$ and peak height at either 722 $cm^{-1}$ or 732 $cm^{-1}$, whichever is higher. For propylene ethylene copolymers having 75 wt % or less propylene content, the comonomer (ethylene) content can be measured using the procedure described in Wheeler and Willis.

EXAMPLES

The thermoplastic olefin compounds of embodiments of the invention were formulated in 16 mm Thermo Prism twin screw extruder. Compounding in the twin screw extruder was accomplished using an intense mixing screw element. The batch size was 1000 gm. The temperature profile in the various extruder zones was ramped progressively from 170° C. to 210° C. The compounds discharged from the extruder were pelletized.

Pellet Stability

Pellet stability of the samples was evaluated using small amplitude oscillatory shear (SAOS). 2 gram samples of polymer were tested over a period of 1 hr. SAOS was conducted at 50° C., 40° C., and 30° C. Strain was held constant at 0.5% in the linear viscoelastic region and the frequency was varied from 100 to 0.1 rad/s. G' and G" values of the polymer were measured and plotted versus frequency. The frequency at which the G' and G" value intersected were recorded as "crossover frequency." The lower the crossover frequency, the better the pellet stability of the polymer. For polymers with superior pellet stability, very low or no (undetectable) crossover frequency may be observed.

Preparation of the Ethylene-Propylene Copolymer Blend.

All of the blends are made in solution or by melt blending in internal mixers or extruders. In all cases where multiple blending procedures are described, each blend may be carried out in solution or in the melt.

All of the inventive blend composition polymers are physical blends of an amorphous ethylene-propylene copolymer (EP), semi-crystalline EP, and a propylene-based elastomer (PBE). The ethylene-propylene copolymer blend may be made either as three individual components, namely amorphous ethylene-propylene copolymer EP, semi-crystalline EP, and a propylene-based elastomer (PBE) which are blended together or as a blend of amorphous ethylene-propylene copolymer EP, semi-crystalline EP, which is subsequently blended with the PBE. In a refinement of the blending procedure, the amorphous ethylene-propylene copolymer EP, semi-crystalline EP may be made in sequential or parallel polymerization processes, blended during polymerization and recovered as a blend. Notwithstanding the sequence or the procedure of blending, the amorphous ethylene-propylene copolymer EP and the semi-crystalline EP are each made in solution polymerization with 1, 1'-bis (4-triethylsilylphenyl)methylene-(cyclopentadienyl)(3,8-di-tertiary-butyl-1-fluroenyl)hafnium dimethyl catalyst and dimethylaninliniumtetrakis(pentafluorophenyl)borate activator while the propylene-based elastomer PBE is made dimethylsilylbis(indenyl)hafnium dimethyl catalyst and dimethylaniliniumtetrakis(heptafluoronaphthyl)borate activator.

All co-polymerizations for amorphous ethylene-propylene copolymer EP, semi-crystalline EP, and PBE were carried out in single-phase liquid-filled, stirred tank reactors with continuous flow of feeds to the system and continuous withdrawal of products under steady state conditions. All polymerizations were done in a solvent comprising predominantly $C_6$ alkanes, referred to generally as hexane solvent, using soluble metallocene catalysts and discrete, non-coordinating borate anion as described above as co-catalysts. Hydrogen was added, if necessary, to control molecular weight. The hexane solvent was purified over beds of 3 A mole sieves and basic alumina. Reactor temperature was controlled adiabatically by controlled chilling of the feeds and using the heat of polymerization to heat the reactor. The reactors were maintained at a pressure in excess of the vapor pressure of the reactant mixture to keep the reactants in the liquid phase. In this manner the reactors were operated liquid full in a homogeneous single phase. Ethylene and propylene feeds were mixed with a pre-chilled hexane solvent stream. A hexane solution of a tri-n-octyl aluminum scavenger was added to the combined solvent and monomer stream just before it entered the reactor to further reduce the concentration of any catalyst poisons. A mixture of the catalyst components in solvent was pumped separately to the reactor and entered through a separate port. The reaction mixture was stirred aggressively to provide thorough mixing over a broad range of solution viscosities. Flow rates were set to maintain an average residence time in the reactor of about 10 minutes. On exiting the reactor, the copolymer mixture from each reactor was combined and subjected to quenching, a series of concentration steps, heat and vacuum stripping and pelletization, the general conditions of which are described in International Patent Publication WO 99/45041, incorporated herein by reference in its entirety.

All polymer compositions in were synthesized in one continuous stirred tank reactors. The polymerization was performed in solution, using hexane as a solvent. In the reactor, polymerization was performed at a temperature of 110° C. to 115° C., an overall pressure of 20 bar and ethylene and propylene feed rates of 1.3 kg/hr and 2 kg/hr respectively. As catalyst, N,N-dimethylanilinium tetrakis(pentafluorophenyl)boron was used to activate di(p-triethylsilylphenyl)methenyl[(cyclopentadienyl)(2,7-di-tert-butylfuorenyl)] hafnium dimethyl. In the process, hydrogen addition and temperature control were used to achieve the desired melt flow rate. The catalyst, activated externally to the reactor, was added as needed in amounts effective to maintain the target polymerization temperature. The copolymer solution emerging from the reactor was stopped from further polymerization by addition of water and then devolatilized using conventionally known devolatilization methods such as flashing or liquid phase separation, first by removing the bulk of the hexane to provide a concentrated solution, and then by stripping the remainder of the solvent in anhydrous conditions using a devolatilizer or a twin screw devolatilizing extruder so as to end up with a molten polymer composition containing less than 0.5 wt % of solvent and other volatiles. The molten polymer was cooled until solid.

The amorphous EP from the first polymerization and the semi-crystalline EP from the second polymerization were physically blended using an extruder. The batch size for twin screw compounding was 30 kg. Compounding in the ZSK extruder was accomplished by tumble-blending the two components (listed in Table 1) in a V-cone blender and introducing the blend into the extruder hopper. The melt temperature was maintained at 230° C.

An ethylene-propylene copolymers (EPR) was prepared by blending amorphous ethylene-propylene copolymers with semi-crystalline ethylene-propylene copolymers.

The propylene-based elastomer used throughout the examples is Vistamaxx™ 6102 performance polymer, commercially available from ExxonMobil Chemical Company. Vistamaxx™ 6102 is a propylene-ethylene copolymer having a density of 0.862 g/cm³, melt index (at 190° C., 2.16 kg) of 1.4 g/10 min, MFR of 3 g/10 min, and ethylene content of 16 wt %.

An ethylene-propylene copolymer (EPR) was prepared by blending amorphous ethylene-propylene copolymers with semi-crystalline ethylene-propylene copolymers.

TABLE 1

ETHYLENE-PROPYLENE COPOLYMERS

| Copolymer Component | MFR (g/10 min) | $C_2$ (wt %) | $C_3$ (wt %) |
|---|---|---|---|
| Amorphous Ethylene-Propylene Copolymer A1 | 0.5 | 49.0 | 51.0 |
| Semi-crystalline Ethylene-Propylene Copolymer S1 | 15.1 | 67.0 | 33.0 |
| Semi-crystalline Ethylene-Propylene Copolymer S2 | 4.1 | 67.0 | 33.0 |
| Semi-crystalline Ethylene-Propylene Copolymer S3 | 0.8 | 68.0 | 32.0 |
| Semi-crystalline Ethylene-Propylene Copolymer S4 | 14.0 | 73.7 | 26.3 |

TABLE 1-continued

ETHYLENE-PROPYLENE COPOLYMERS

| Copolymer Component | MFR (g/10 min) | $C_2$ (wt %) | $C_3$ (wt %) |
|---|---|---|---|
| Semi-crystalline Ethylene-Propylene Copolymer S5 | 11.0 | 74.6 | 25.4 |
| Semi-crystalline Ethylene-Propylene Copolymer S6 | 1.6 | 74.0 | 26.0 |
| Semi-crystalline Ethylene-Propylene Copolymer S7 | 5.5 | 76.5 | 23.5 |
| Semi-crystalline Ethylene-Propylene Copolymer S8 | 2.3 | 79.0 | 21.0 |

Example Compositions

Sixteen bimodal ethylene-propylene copolymers (EPRs) were prepared by blending 75 or 90 wt % of an amorphous ethylene-propylene copolymer of Table 1 with 10 or 25 wt % of semi-crystalline ethylene-propylene copolymer of Table 1. The pellet stability of the bimodal EPRs is reported in Table 2.

TABLE 2

BIMODAL ETHYLENE-PROPYLENE COPOLYMERS

| Sample | Copolymer Component | Pellet Stability (Crossover of G" and G' at 30° C.) |
|---|---|---|
| Sample 1 | EPR1 (90 wt % A1/10 wt % S1) | 0.14 |
| Sample 2 | EPR 2 (90 wt % A1/10 wt % S2) | 0.09 |
| Sample 3 | EPR 3 (90 wt % A1/10 wt % S3) | 0.06 |
| Sample 4 | EPR 4 (90 wt % A1/10 wt % S4) | 0.03 |
| Sample 5 | EPR 5 (90 wt % A1/10 wt % S5) | 0.01 |
| Sample 6 | EPR 6 (90 wt % A1/10 wt % S6) | 0.06 |
| Sample 7 | EPR 7 (90 wt % A1/10 wt % S7) | 0.06 |
| Sample 8 | EPR 8 (90 wt % A1/10 wt % S8) | 0.04 |
| Sample 9 | EPR 9 (75 wt % A1/25 wt % S1) | 0.04 |
| Sample 10 | EPR 10 (75 wt % A1/25 wt % S2) | 0.03 |
| Sample 11 | EPR 11 (75 wt % A1/25 wt % S3) | 0.03 |
| Sample 12 | EPR 12 (75 wt % A1/25 wt % S4) | None |
| Sample 13 | EPR 13 (75 wt % A1/25 wt % S5) | None |
| Sample 14 | EPR 14 (75 wt % A1/25 wt % S6) | None |
| Sample 15 | EPR 15 (75 wt % A1/25 wt % S7) | None |
| Sample 16 | EPR 16 (75 wt % A1/25 wt % S8) | None |

Ethylene-propylene copolymers were prepared by blending 90 wt % EPR listed in Table 2 with 10 wt % VMX 6102. It is appreciated that the use of the inventive copolymers, along with propylene homopolymers, and/or ethylene plastomers, and/or fillers for thermoplastic olefin compositions displays improved performance as compared to conventional ethylene-alpha olefin polymers currently used for such compositions.

For all jurisdictions in which the doctrine of "incorporation by reference" applies, all of the test methods, patent publications, patents and reference articles are hereby incorporated by reference either in their entirety or for the relevant portion for which they are referenced.

The invention claimed is:
1. A polyolefin composition comprising:
   a. about 75 wt % to about 90 wt % based on the total weight of the composition of an amorphous ethylene-propylene copolymer having either no crystallinity or crystallinity derived from ethylene, having about 30 wt % or more units derived from ethylene;

b. about 5 wt % to about 25 wt % based on the total weight of the composition of a semi-crystalline ethylene-propylene copolymer having substantial crystallinity derived from ethylene and having about 70 wt % or more units derived from ethylene; and c. about 1 wt % to about 5 wt % based on the total weight of the composition of a propylene-based elastomer having within the range from 5 to 25 wt % ethylene derived units and having a melting point temperature of less than 110° C. and a Mw/Mn within the range from 2.0 to 4.0.

2. The composition of claim 1, wherein composition is a reactor blend of the amorphous ethylene-propylene copolymer, the semi-crystalline ethylene-propylene copolymer, and the propylene-based elastomer.

3. The composition of claim 1, wherein the composition is a physical blend of the amorphous ethylene-propylene copolymer, the semi-crystalline ethylene-propylene copolymer, and the propylene-based elastomer.

4. The composition of claim 1, wherein the composition has greater about 70 wt % to about 80 wt % units derived from ethylene.

5. The composition of claim 1, wherein the composition is substantially free of diene units.

6. The composition of claim 1, wherein the propylene-based elastomer has a melting point temperature within the range of from 80° C. to 110° C.

7. The composition of claim 1, wherein the composition has a total ethylene content within the range of 6 to 25 wt %.

8. The composition of claim 1, wherein the amorphous ethylene-propylene copolymer has a melt flow rate of about 0.01 g/10 min to about 1 g/10 min.

9. The composition of claim 1, wherein the semi-crystalline ethylene-propylene copolymer has a melt flow rate of about 0.1 g/10 min to about 15 g/10 min.

10. The composition of claim 1, wherein the amorphous ethylene-propylene copolymer has about 35 wt % to about 55 wt % of units derived from ethylene.

11. The composition of claim 1, wherein the semi-crystalline ethylene-propylene copolymer has about 70 wt % to about 80 wt % of units derived from ethylene.

12. An automotive component made from the composition of claim 1.

13. A polyolefin composition comprising:

a. about 80 wt % to about 90 wt % based on the total weight of the composition of an amorphous ethylene-propylene copolymer having either no crystallinity or crystallinity derived from ethylene, having from about 35 wt % to about 55 wt % units derived from ethylene;

b. about 5 wt % to about 15 wt % based on the total weight of the composition of a semi-crystalline ethylene-propylene copolymer having substantial having substantial crystallinity derived from ethylene, having from about 70 wt % to about 80 wt % units derived from ethylene; and c. about 1.5 wt % to about 3.5 wt % based on the total weight of the composition of a propylene-based elastomer having within the range from 6 to 20 wt % ethylene derived units and having a melting point temperature of less than 110° C., a melt flow rate of about 0.1 g/10 min to about 3 g/10 min, and a Mw/Mn within the range from 2.0 to 4.0.

14. The composition of claim 13, wherein the amorphous ethylene-propylene copolymer has a melt flow rate of about 0.01 g/10 min to about 1 g/10 min.

15. The composition of claim 13, wherein the semi-crystalline ethylene-propylene copolymer has a melt flow rate of about 0.1 g/10 min to about 15 g/10 min.

16. An automotive component made from the composition of claim 13.

* * * * *